Oct. 28, 1969 R. H. McMANN, JR 3,475,555

DUAL RESOLUTION SCANNING SYSTEM USING CARRIER TRANSMISSION OF PLURAL VIDEO SIGNALS

Filed April 22, 1966 3 Sheets-Sheet 1

INVENTOR.
RENVILLE H. McMANN

BY

Brumbaugh, Free, Graves & Donohue his ATTORNEYS

INVENTOR.
RENVILLE H. McMANN

BY

Brumbaugh, Free, Graves & Donohue his ATTORNEYS

INVENTOR.
RENVILLE H. McMANN J
BY
Brumbaugh, Free, Graves & Donohue
his ATTORNEYS United States Patent Office 3,475,555

Patented Oct. 28, 1969

3,475,555
DUAL RESOLUTION SCANNING SYSTEM USING CARRIER TRANSMISSION OF PLURAL VIDEO SIGNALS

Renville H. McMann, Jr., New Canaan, Conn., assignor to Columbia Broadcasting System, Inc., New York, N.Y., a corporation of New York Filed Apr. 22, 1966, Ser. No. 544,572
Int. Cl. H04n *3/28*
U.S. Cl. 178—6.8 23 Claims

ABSTRACT OF THE DISCLOSURE

A dual resolution reconnaissance system for scanning and transmitting video information contained on a photographic medium, in which adjacent transverse portions of the record medium are simultaneously scanned with a radiant energy beam to develop a pair of video signals. Those signals are employed to modulate a carrier signal in amplitude and phase in accordance with the information contained in the video signals, and the modulated carrier can be transmitted either directly or as a subcarrier of a transmission carrier signal. In a preferred embodiment of the invention, an optical system is selectively operated to obtain either a coarse or high resolution scan in high or slow scanning modes, respectively.

The present invention relates to reconnaissance systems in which intelligence contained on a record medium at an originating station must be analyzed and conveyed to a remote station where it is reproduced. Specifically, the invention is directed to reconnaissance systems of this type in which the record medium, for example, a film containing picture information of a reconnoitered area, may be interrogated utilizing both high and low resolution scanning to develop one or more video signals for simultaneous transmission thereof to the remote station.

In my application Ser. No. 99,850, filed Mar. 31, 1961, now U.S. Patent No. 3,234,327, there is disclosed a high resoltuion scanning system for improving the quality of resolution to be obtained from conventional scanning elements such as a flying spot scanner or line scan tube. As taught in that application, information recorded on, for example, a longitudinally moving strip of film, can be analyzed by simultaneously scanning the film with two or more continuous scanning beams from the line scan tube which have been condensed or compressed to trace out shorter fine lines in adjacent transverse portions of the record. The video signals corresponding to the information scanned by each of the individual scanning beams projected on the record are then transmitted sequentially to a remote receiving station where the recorded information is reconstituted. This system possesses superior scanning resolution approaching the resolution of the record; however, the sequential transmission of individual video signals produced by the several scanning lines requires a total transmission time which is multiplied by the number of scanning lines employed.

The present invention relates to or carries forward the teachings of the above-mentioned application. In the present system the individual video signals produced by scanning adjacent transverse portions of a record strip, conveyed longitudinally past a scanning area, are processed for simultaneous transmission and utilization of the narrowest possible transmission bandwidth. In addition, the present system employs a coarse or low resolution scan in which a radiant spot of comparatively large cross section is swept across the full width of the record medium. The motion of this large spot produces a scan line of which the thickness approaches the spot's diameter, thereby requiring fewer scan lines and less time to interrogate the complete picture.

The video signal developed by the coarse scan is then transmitted to the remote station for reconstruction of the original picture. There the picture may be given cursory inspection to determine whether any information on the record deserves more careful scrutinization. In the event that the record contains intelligence of particular interest, e.g., a singular small area on a photograph, the system can be controlled to reposition the film for a slow, or fine, scan of that particular area. At this time, interrogation is carried out by simultaneous scanning of adjacent transverse portions of the film with one or more high resolution beams of small diameter.

Any pair of two video signals generated by such simultaneous scanning are then used in a phase modulation system to produce a subcarrier signal that is modulated in amplitude and phase according to the video signal information. A transmission carrier is amplitude modulated by the modulated subcarrier, thereby transmitting information contained in both video signals simultaneously. In a preferred form of the invention, the subcarrier frequency is suppressed from the composite signal to prevent interference with the video signals, and a reference carrier is generated for transmission on the main carrier to facilitate demodulation at the remote station. When more than two high resolution scanning beams are used, up to two of the additional video signals developed thereby are used to modulate a second subcarrier which is displaced in frequency by the bandwidth (or half-bandwidth) of the video signals. In this manner, the bandwidth required for transmission of the total high resolution picture is less than half of that required using conventional amplitude modulation techniques, without sacrifice of the time necessary to transmit a complete picture. Further conservation of bandwidth may be realized by employing single or vestigal sideband transmission.

For a better understanding of the invention, reference may be made to the following detailed description of an exemplary embodiment thereof, and to the drawings in which.

In accordance with the invention, it is desired to interrogate an intelligence-bearing record (e.g., a strip of film) and develop video signals corresponding to the recorded intelligence for transmission to a remote receiving station. As discussed briefly above, interrogation is carried out by one of two scanning modes employing a moving radiant energy beam, one mode being to scan adjacent transverse portions of the record, and the other being to scan the entire lateral dimension of the recorded information. Vertical shift of successive scan lines is accomplished by continuously conveying the record in its elongated or longitudinal direction past a scanning area.

When the system is operated in the coarse scanning mode, a light beam of comparatively large cross-section is used to scan the entire width of the record, thereby developing a scanning pattern containing a series of substantially contiguous thick lines extending across the whole scanning area. The additional width of the individual scansions allows the use of increased longitudinal velocities of the record strip. In the high resolution scanning mode, the cross-sectional dimension of the light beam is compressed so that very narrow scan lines are traced out on the record. In this mode, a correspondingly slower record speed is employed in order to maintain contiguity of the successive narrow scan lines.

Figure 1:
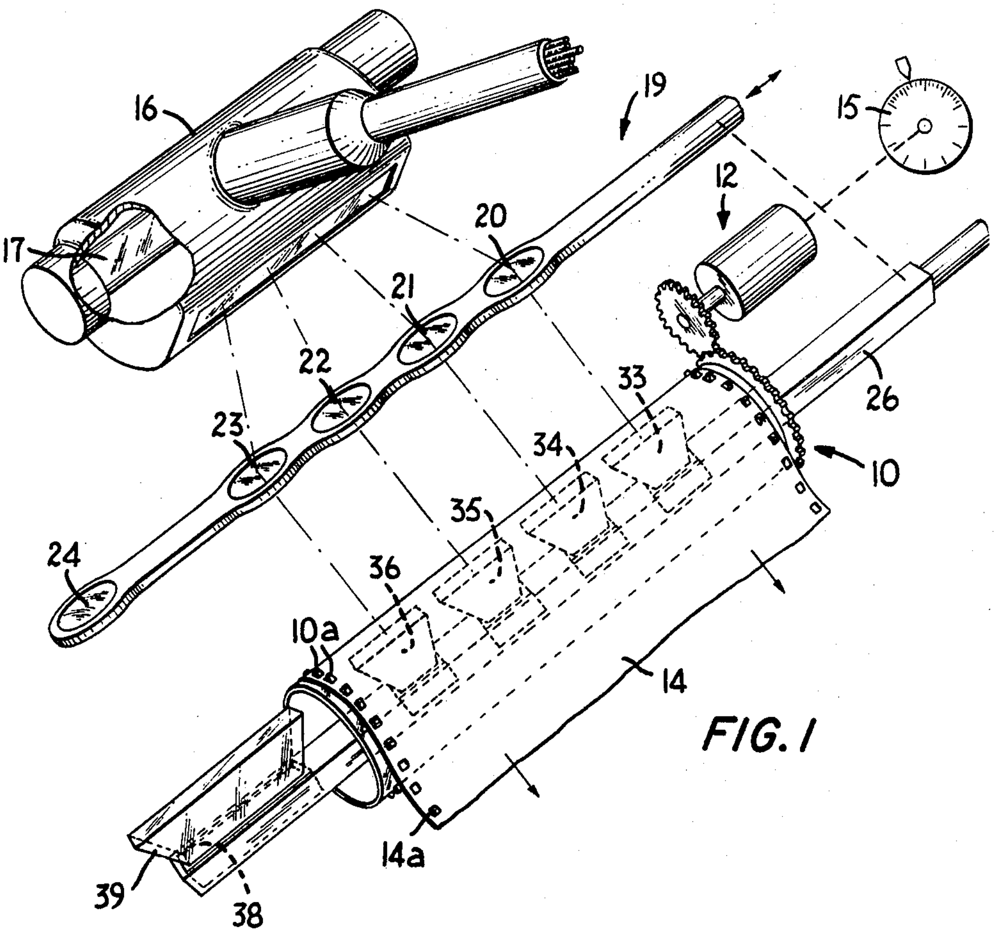
FIGURE 1 is a diagrammatic representation of the mechanical and optical components of a reconnaissance system in accordance with the invention.

FIGURE 1 illustrates the basic mechanical and optical components of the scanning apparatus which includes a rotary transparent drum 10 driven by an accurate servo control device 12. The record strip 14, which hereinafter is assumed to be a film transparency, is passed over the drum 10 where sprocket teeth 10*a* engage the perforations 14*a* in the film. The drum 10 is supported for rotation at the ends of its outer circumferential surface in suitable support of bearing means (not shown). A satisfactory drum and control device for use with the invention is the high accuracy film drive unit manufactured by Sequential Electronics, which is capable of angular position accuracy within .001 rotational degree. A conventional index indicator 15, mechanically coupled to the drum, registers the angular position for presentation to the operator.

A line scan tube 16 is positioned with respect to the drum 10 to project a moving beam of radiant (light) energy onto the surface of the film 14. This tube is of the type having a rotary cylindrical anode 17 which is excited with a high energy electron beam in order to produce an extremely bright spot of light. To prevent the anode from burning out by continuous electron bombardment of the same anode area, the anode is rotated by a motor (not shown) housed within the tube. The light beam emitted from the scan tube 16 is received by an optical system, indicated at 19 as a series of lens barrels 20, 21, 22, 23 and 24, which focuses the light spot (traveling cyclically in a horizontal line across the rotary phosphor anode 17) into the plane of the record medium. Representative of the line scan tubes which are satisfactory for use in the present system is the CL100P16 tube available from CBS Laboratories, Stamford, Conn.

In FIGURE 1, the optical system 19 is shown positioned for high resolution scanning of the film 14. As shown, each of the lenses 20–23 is selected to focus the scanning line at the phosphore anode 17 onto the surface of the film 14 so that its transverse velocity across the film 14 is substantially constant. Disposed beneath the record medium interiorally of the drum 10 is an actuator mechanism 26 which supports photosensitive devices responsive to the intensity of the light beam impinging the film and passing through the transparent drum 10. These devices may be, for example, photocells or photomultipliers have a spectral response characteristic compatable with the color content of the light beam transmitted through the record medium and drum.

Figure 3:
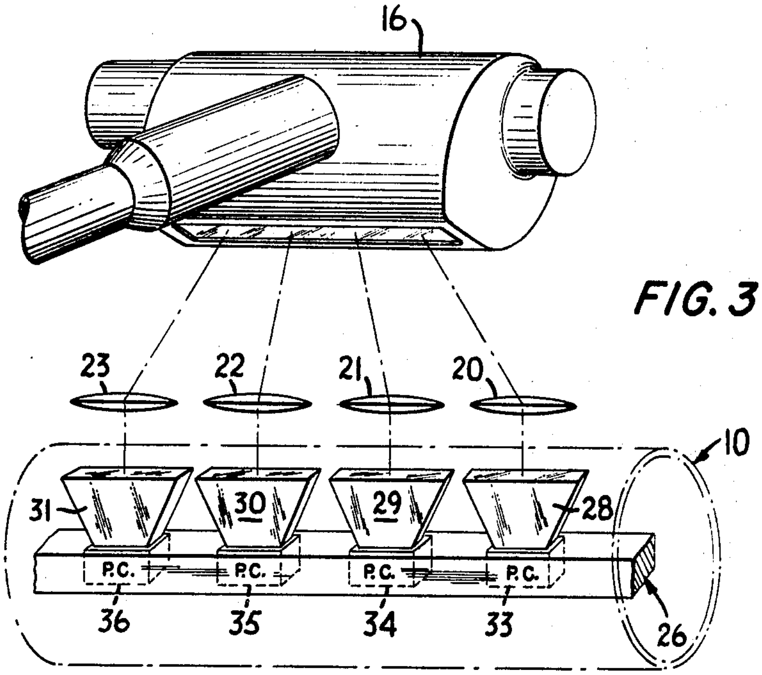
FIGURE 3 is a diagrammatic representation of a portion of the apparatus shown in FIGURE 1.

As is best apparent in FIGURE 3, conventional light guides 28, 29, 30 and 31 are supported above the individual photoelectric devices, shown as photocells 33–36 in FIGURE 3, for directing each scanning beam from the under-surface of the drum to the respective photocell. It is, of course, understood that the light beams are intensity modulated by the information recorded on the film 14 to produce corresponding video signals at the photocell outputs.

Figure 2:
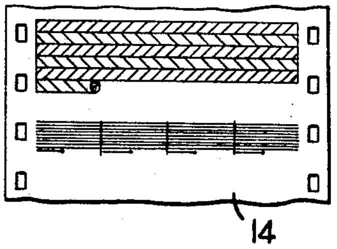
FIGURE 2 is a plan view of a record strip, showing scanning line patterns in accordance with the invention for low and high resolution interrogation of the recorded information.

FIGURE 2 shows a plan view of a portion of the film 14, illustrating the path of the scanning beam in both the high and low resolution scanning modes. In the low resolution mode of operation to be discussed shortly, the succesive scansions of the scanning beam cover the full width of the film 14. Because of the width of the beam (in the longitudinal direction of the film 14), the film can be conveyed at a comparatively high longitudinal velocity for rapid interrogation. In the high resolution scanning mode, the size of the scanning beam spot is considerably smaller, and correspondingly narrower scansions are traced out on the film. Since the scanning line projected on the film 14 from the line scan tube 16 is divided into four individual scanning lines, the scansions associated with each of the lenses 20, 21, 22 and 23 cover only one-fourth of the width of the film, each of the beams scanning adjacent transverse portions or segments of the film simultaneously.

In order to obtain a coarse, or low resolution scan, the actuating mechanism 26, to which is coupled the optical system 19, is moved to the right from the position shown in FIGURE 1. In this second position the photocell 38 and its associated light guide 39 are disposed to receive light from the entire scanning line moving across the whole width of the film 14. To ensure that the scanning beam from the line scan tube 16 is properly projected on the film, the lens 24 is simultaneously moved with the photocell 38 and the light guide 39 to intercept the beam and focus it at the plane of the film. In this manner, a single video signal is developed by the photocell 38 during the coarse scanning of the record medium, whereas during high resolution scanning, the photocells 33–36 produce four individual video signals, each corresponding to intelligence contained on the adjacent tranverse film segments.

Figure 4:
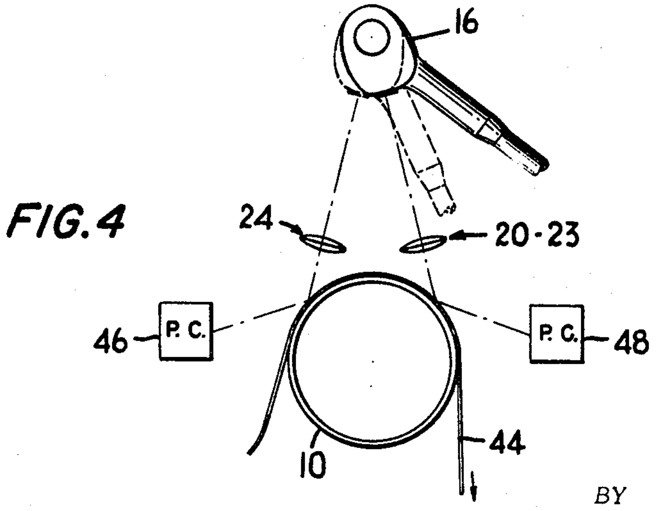
FIGURE 4 is a diagrammatic side view of an alternate form of the invention shown in FIGURE 1.

In FIGURE 4 there is illustrated an alternate form of scanning apparatus in which the scanning beam is reflected from the surface of an opaque record medium 44 such as a positive photographic print. In this instance, the scan tube 16 is supported for rotation from the position shown, in which the beam passes through the lenses 20–23 for high resolution scanning, to the position indicated by the phantom lines, in which the light beam passes through the lens 24 for coarse scanning of the medium 44. In either position of the scan tube, the beam is reflected from the medium surface to photosensitive pickups arranged to receive the light impinging a selected scanning area. A single photocell indicated at 46 is operative during coarse scanning, and the photocell bank 48 containing four photocells is activated during fine scanning.

In order to obtain faithful reproduction from video signals derived from scanning the record medium at suitable horizontal scanning frequencies and with a resolution compatible with the resolution of the best known films currently used, for example, in aerial photography, it has been found that the video information should be alloted about a six megacycle frequency bandwidth. However, if the film is scanned simultaneously to develop four video signals of which the bandwidth of each is coextensive with the bandwidth of the others, as in the scheme illustrated in FIGURE 1, a transmission bandwidth of at least 24 megacycles would be required to avoid interference of the signals during simultaneous transmision of all video information. Further, if, as is preferable, the six megacycle bandwidth video signals are transmitted utilizing both carrier sidebands, the required frequency transmission bandwidth must be extended to 48 megacycles. This, as will be readily appreciated, is unduly wasteful of the available radio transmission channels. In accordance with the invention, the required transmission bandwidth is halved by utilizing one or more subcarriers which are modulated in phase and amplitude in accordance with the information contained in two of the video signals to be conveyed.

Figure 6:
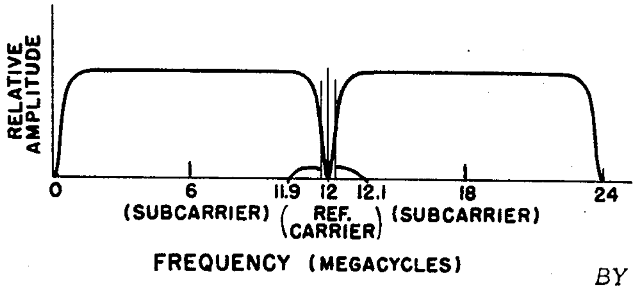
FIGURE 6 is a graph of the bandwidth spectrum required for transmission of vedio signals produced by the system of FIGURE 5.

FIGURE 6 shows the frequency spectrum required for simultaneous transmission of the video signals developed from interrogation of the four adjacent transverse portions (FIGURE 2) of the film 14 scanned by the apparatus in FIGURE 1. As shown, the total bandwidth required for dual sideband transmission ranges from 0 to 24 megacycles/sec. Each pair of video signals, i.e., any two of the video signals, are impressed on one of the subcarriers having frequencies of 6 and 18 megacycles/sec. relative to the lower edge of the transmission channel. The amplitudes of the subcarriers are shown small in FIGURE 6 since they are desirably (although not necessarily) suppressed. One of the video signals is used to modulate the amplitude of an in-phase component of the subcarrier, while another video signal amplitude-modulates the subcarrier in quadrature to yield a subcarrier whose resultant intensity varies in amplitude and phase. A dip in the relative amplitude of the bandwidth appears at a relative frequency of 12 mc./sec. where a reference carrier is interjected so that the inphase and quadrature components of the subcarrier frequencies can be properly demodulated at the remote receiving station. The reference carrier, of course, is necessary only when the 6 and 18 megacycle subcarriers are suppressed.

Figure 5:
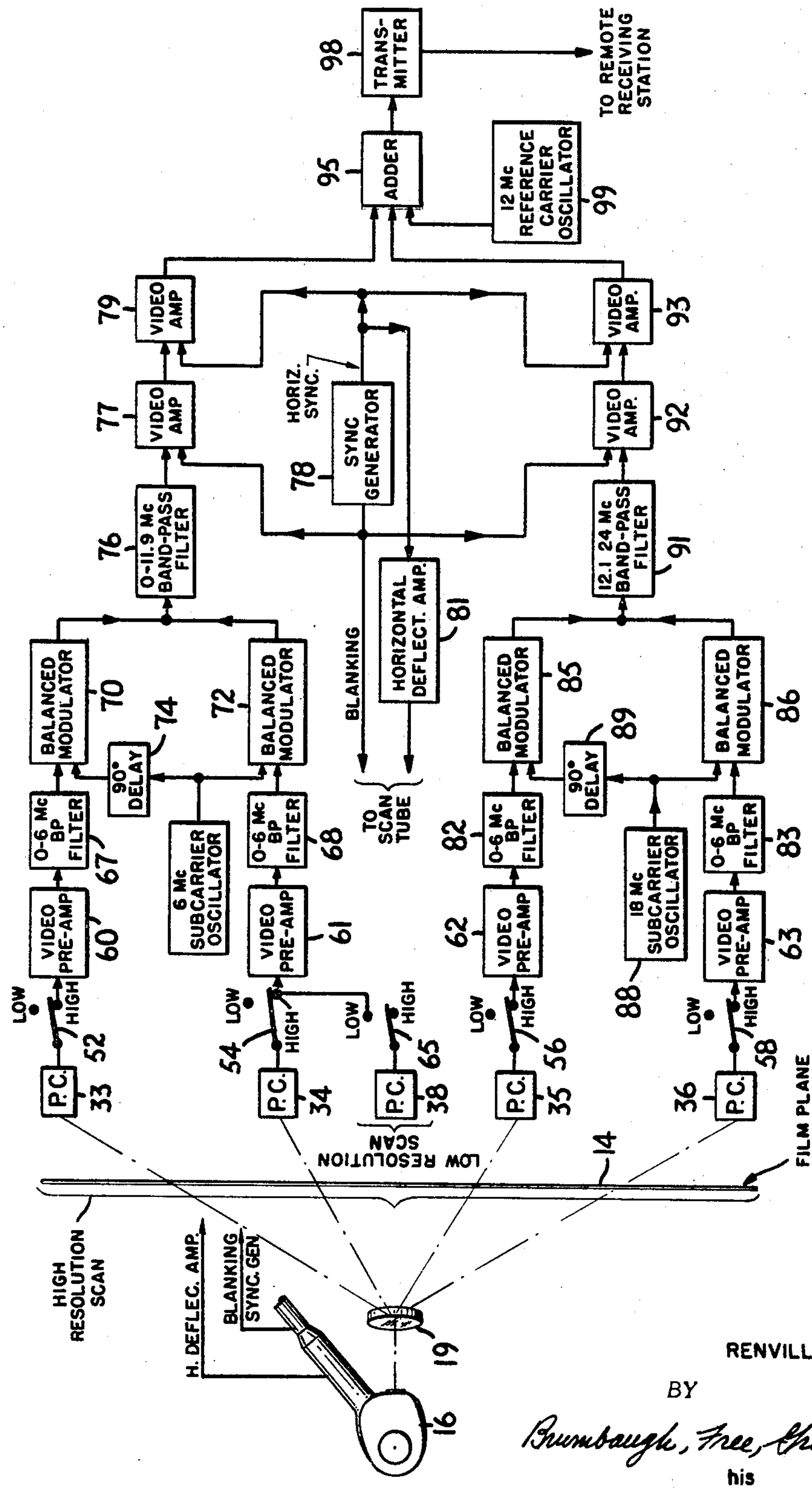
FIGURE 5 is a block diagram of an electrical system for producing and simultaneously transmitting video signals in accordance with the invention.

Turning now to FIGURE 5, there is shown an electronic system for simultaneously transmitting the video signals obtained from both coarse and fine scanning of the record. In the high resolution mode, the video signals from the photocells 33–36 pass through ganged selector switches 52, 54, 56 and 58, respectively, which in the "HIGH" resolution positions shown couple the video signals to the associated video preamplifiers 60, 61, 62 and 63. When low resolution scanning is selected, these switches are moved to the "LOW" resolution position, disconnecting the outputs of the photocells from the video preamplifiers. At the same time, the switch 65, which is mechanically coupled to the other selector switches, connects the output of the photocell 38 (mounted to the actuator mechanism 26 and positioned to receive the scanning beam during the low resolution scan mode) to the video preamplifier 61 alone.

Following the signal path from the photocells 33 and 34 through the system in the high resolution mode of operation, the video signals pass through 0–6 mc./sec. band-pass filters 67 and 68 which limit the video bandwidth of the information to be transmitted. The signals at the outputs of the filters 67 and 68 are connected to the modulating signal inputs of the balanced modulators 70, 72. The six megacycle subcarrier signal i.e., a subcarrier having a frequency of 6 megacycles above the frequency at the lower edge of the transmission channel, is routed directly into one of the balanced modulators 72 and also into a 90° delay until 74 which displaces the phase of the subcarrier by 90° prior to modulation in the balanced modulator 70. The outputs from the modulators 70 and 72 are then combined to give a resultant suppressed subcarrier which is modulated in both amplitude and phase in accordance with the information represented by the two video signals from the photocells 33 and 34. Thereafter, the suppressed amplitude and phase-modulated 6 mc./sec. subcarrier passes through a 0–11.9 mc./sec. band-pass filter 76 and into a first video amplifier 77 where blanking signals from the synchronizing generator 78 are added thereto. Horizontal synchronization pulses from the sync generator are added in a second video amplifier 79. Since the video signals from the photocells 33 and 34 cover a range of 0–6 mc./sec. the total frequency spectrum of the modulated subcarrier will embrace a bandwidth including 6 mc. at either side of the subcarrier frequency, or a 12 mc. bandwidth. The filter 76 cuts off the upper end of the upper sideband in order to provide for the later insertion of a 12 mc. reference carrier, as will be discussed shortly.

The blanking signal from the sync generator 78 is also employed to control blanking of the scanning spot in the line scan tube 16. Similarly, the horizontal synchronization pulses are received by a horizontal deflection amplifier 81 for application to the horizontal deflection yoke of the line scan tube 16.

Following a similar route, video signals at the outputs of the photocells 35 and 36 are amplified in the video preamplifiers 62 and 63 and procesed through the 0–6 mc. band-pass filters 82 and 83. These signals are then used in the balanced modulators 85 and 86 for modulation of in-phase and quadrature components of an 18 mc./sec. subcarrier signal from the subcarrier oscillator 88. The 90° delay unit 89 provides the necessary phase shifting of the subcarrier signal supplied to the modulator 85. The combined subcarrier signal from the balanced modulators 85, 86 then pass through a 12.1–24 mc./sec. band-pass filter 91 and into the video amplifiers 92 and 93 where blanking and horizontal synchronization signals are added. The band-pass filters 76 and 91 together furnish the dip at 12 megacycles in the transmission bandwidth illustrated in FIGURE 6.

Next, the modulated subcarriers are combined in the adder 95 with a 12 mc./sec. reference carrier from the oscillator 99 and sent to the transmitter 98 for transmission to the remote receiving station.

It was noted briefly above that it is preferable to employ dual sideband transmission of the modulated subcarriers. This is due to the fact that suppression of one of the side bands usually results in some distortion of the video signal. However, the invention is equally applicable to single or vestigial sideband transmission in which the total bandwidth is further compressed. This can be conveniently accomplished by proper selection of the band pass filters 76 and 91 in the FIGURE 5 system so that only the two adjacent subcarrier sidebands are retained for transmission.

From the foregoing it is understood that in a typical application such as aerial reconnassance, the system is initially operated in the coarse, or low resolution mode for rapid interrogation of the film 14 (FIGURE 1). Accordingly, the light beam from the scan tube 16 is projected through the lens 24 onto the film and the drum 10 driven at a speed to produce substantially contiguous scan lines (FIGURE 2) across the full width of the intelligence-bearing portion of the film. Modulation of the light beam intensity by the intelligence on the film produces a video signal at the output of the photocell 38, which then proceeds through the system of FIGURE 5, beginning at the selector switch 65 and video preamplifier 61. The video information in this case is used to modulate the in-phase component of the lower frequency (6 mc./sec.) subcarrier for transmission to the remote receiving station.

Reproducing apparatus at the receiving station reconstitutes the original "picture" for immediate analysis, if necessary. If, upon review, it is desired to obtain a more detailed, high resolution picture of a certain longitudinal portion of the film, the operator of the system in the aircraft repositions the film by rotating the drum 10 through control of the servo drive 12 so that the desired longitudinal portion of the film is reconveyed past the scanning zone. At this time, the selector switches 52–58 and 65 are thrown to the "HIGH" resolution position and the drum 10 rotated at a slower speed. In addition, the actuator mechanism 26 is controlled to position the optical system 19 to receive the beam from the line scan tube 16 and project it onto the film 14 for high resolution scanning of the four individual transverse segments of the film. Individual video signals corresponding to information recorded in each transverse segment are developed at the outputs of the photocells 33–36 and used to modulate the subcarriers in the manner explained above in connection with FIGURE 5.

The system of FIGURE 5 is also well suited for sequential transmission of video signals developed by the photocells 33–36. In this event, the switches 52–58 schematically pictured as mechanical devices, may be of an electronic type adapted for rapid switching of the video signals to the respective preamplifier signals. The switching sequence rate, of course, may be made compatible with, for example, reproducing and display equipment at the remote station. It is, moreover, apparent that when transmitting only one high resolution video signal at a time, only one high resolution scanning beam need be focused on the record strip in the area to be interrogated.

From the preceding, it is seen that the invention provides improved scanning and video reproduction and transmission systems which can develop and transmit several high resolution video signals with maximum conservation of transmission frequency bandwidth. Moreover, this is accomplished in the same amount of time that would be required to scan the record to develop a lone video signal.

Although the invention has been described with reference to specific embodiments, it is understood that many modifications and variations, both in form and detail, may be made within the skill of the art. All such modifications and variations, therefore, are intended to be included within the scope and spirit of the invention as defined in the appended claims.

I claim:

1. In a high resolution reconnaissance system for interrogating and conveying picture information recorded on a record medium: scanning apparatus for simultaneously scanning first and second transverse portions of the medium with a radiant energy beam to generate, respectively, first and second video signals of which each has a bandwidth coextensive with the bandwidth of the other and of which each represents information contained in different portions of the picture to be conveyed; means for modulating a first carrier signal in amplitude and phase in accordance with information contained in the first and second video signals; and means for transmitting the first carrier signal.

2. A system in accordance with claim 1, in which the transmitting means includes apparatus for amplitude modulating a transmission carrier with the first carrier signal and the first carrier signal is a multiple of a common frequency, the system further comprising: means for removing the first carrier frequency signal from the modulated first carrier signal; and means for modulating the transmission carrier with a reference carrier signal having a frequency which is also a multiple of the common frequency.

3. In a reconnaissance system for interrogating and transmitting information recorded on a record medium: scanning apparatus for simultaneously scanning at least three transverse segments of the medium with a radiant energy beam tracing out in each segment a plurality of substantially contiguous transverse scan lines; means responsive to the radiant energy "impinging the medium in each of the segments to generate first, second and third video signals of which each has a bandwidth coextensive with the bandwidth of the other; means for modulating the amplitude and phase of a first subcarrier signal in accordance with the information contained in the first and second video signals; means for modulating a second subcarrier signal in accordance with the third video signal, the second subcarrier being displaced in frequency from the first subcarrier by an amount corresponding to the bandwidths of the video signals produced by scanning; and means for amplitude modulating a transmission carrier with the modulated first and second subcarrier signals.

4. A system in accordance with claim 3 in which the transverse segments are in end-to-end relation across the medium.

5. A system as set forth in claim 3, further comprising: means for suppressing the carrier frequency signals of the modulated first and second subcarriers; and means for modulating the transmission carrier with a reference carrier signal, the frequencies of the first and second subcarriers and the reference carrier being multiples of a common frequency.

6. A system as defined in claim 4, in which: the reference carrier frequency is greater than the highest sideband frequency of the first subcarrier and less than the lowest sideband frequency of the second subcarrier.

7. A system according to claim 1 in which the scanning apparatus includes: means for producing a radiant energy beam moving cyclically in the same direction along a finite line, and optical means disposed to receive and project the beam simultaneously in the plane of the record medium between first and second predetermined transverse limits in the respective transverse segments of the medium.

8. A scanning system for interrogating and conveying information recorded on a record medium, comprising: scanning apparatus for scanning the width of a scanning area with a low resolution radiant energy beam; means for longitudinally conveying the record medium continuously past the scanning area so that the beam traces out on the medium a series of substantially contiguous transverse scan lines; means responsive to the radiant energy impinging the medium for generating a coarse scan video signal; means for modulating a first subcarrier signal in accordance with the coarse scan video signal; means for modulating a transmission carrier with the modulated first subcarrier signal; means for selectively converting the low resolution radiant energy beam into at least two high resolution beams for simultaneously interrogating adjacent transverse portions of the record medium; means responsive to the radiant energy impinging the medium from the high resolution beams for generating first and second video signals having coextensive bandwidths; and means for modulating, when the low resolution beam is converted, the first subcarrier signal in amplitude and phase in accordance with the information contained in the first and second video signals.

9. A system as set forth in claim 8 in which: the means converting the coarse scan beam includes an optical system receiving a generated radiant energy beam from the scanning apparatus, the optical system being effective on the generated beam to project it onto the plane of the record medium so as to produce the two high resolution beams simultaneously tracing out scansions in end-to-end relationship.

10. A system as recited in claim 8 in which: the means converting the low resolution beam is effective to produce four high resolution beams for interrogating four adjacent transverse portions of the record medium; the system further comprising means responsive to the radiant energy impinging the medium from third and fourth of the high resolution beams for generating third and fourth video signals having bandwidths co-extensive with the bandwidths of the first and second video signals; means for modulating a second subcarrier signal in phase and amplitude in accordance with the information contained in the third and fourth video signals, the second subcarrier being displaced in frequency from the first subcarrier by an amount corresponding to the bandwidth of the video signals; and means for amplitude modulating the transmission carrier with the modulated second subcarrier signal.

11. A system as set forth in claim 8, further including means for controlling the conveying means to selectively position a longitudinal portion of the medium desired to be scanned within the scanning area.

12. Apparatus for interrogating and transmitting information recorded on a record medium comprising: scanning apparatus for generating a radiant energy beam moving cyclically in the same direction along a linear path; a rotatable cylindrical drum for longitudinally conveying the record medium thereover continuously past a scanning zone; optical means disposed to receive the radiant energy beam for focusing and projecting the beam onto two adjacent transverse segments of the medium in the scanning zone so that the beam traces out in each segment a series of substantially contiguous transverse lines; means responsive to the radiant energy impinging the medium in each segment for developing first and second video signals; means for modulating a subcarrier signal in amplitude and phase in accordance with the information contained in the first and second video signals; and means for amplitude modulating a transmission carrier with the modulated subcarrier signal.

13. In a method for interrogating and conveying picture information recorded in an area on a record medium, the steps of: scanning first and second transverse portions of the record area with a radiant energy beam to generate, respectively, first and second video signals of which each has a bandwidth coextensive with the other and represents a portion of the picture interrogated; modulating a first carrier signal in amplitude and phase in accordance with the information contained in the first and second video signals; and modulating the amplitude of a transmission carrier with the first carrier signal.

14. A method as recited in claim 12 comprising, in addition, the steps of removing the first carrier signal frequency from the modulated first carrier signal, and modulating the transmission carrier with a reference carrier signal having a frequency which is a multiple of the first carrier frequency.

15. In a method for interrogating and transmitting intelligence recorded on a record medium, the steps of: simultaneously scanning at least three transverse segments of the medium with a radiant energy beam tracing out in each segment a plurality of substantially contiguous transverse scan lines; detecting the radiant energy impinging the medium in each of the segments to generate first, second and third video signals having coextensive bandwidths; modulating the amplitude and phase of a first subcarrier signal in accordance with the information contained in the first and second video signals; modulating a second subcarrier signal in accordance with the third video signal, the second subcarrier being displaced in frequency from the first subcarrier by an amount corresponding to the bandwidths of the video signals produced by scanning; and amplitude modulating a transmission carrier with the modulated first and second subcarrier signals.

16. A method for interrogating and conveying intelligence recorded on a record medium comprising the steps of: scanning the width of a scanning area with a low resolution radiant energy beam; longitudinally conveying the record medium continuously past the scanning area so that the beam traces out on the medium a series of substantially contiguous transverse scan lines; detecting the radiant energy impinging the medium to generate a coarse scan video signal; modulating a first subcarrier signal in accordance with the coarse scan video signal; modulating a transmission carrier with the modulated first subcarrier signal; converting the low resolution radiant energy beam into at least two high resolution beams; repositioning within the scanning area the longitudinal portion of the medium scanned by the low resolution beam; interrogating the scanning area with the two high resolution radiant energy beams tracing out on the medium first and second series of substantially contiguous transverse lines in adjacent transverse segments of the medium; detecting the radiant energy impinging the medium from the high resolution beams to generate, respectively, first and second video signals having coextensive bandwidths; and modulating, during high resolution beam scanning, the first subcarrier signal in amplitude and phase in accordance with the information contained in first and second video signals.

17. A scanning system for interrogating information recorded on a record modium comprising:
- scanning apparatus for scanning the width of a scanning area with a low resolution radiant energy beam;
- means for selectively converting the low resolution radiant energy beam into at least two high resolution scanning beams having a cross-sectional dimension in the scanning area less than the cross-sectional dimension of the low resolution beam and scanning adjacent segments of the medium;
- means for longitudinally conveying the record medium continuously past the scanning area so that the respective beams trace out on the record medium a series of substantially contiguous transverse scan lines during either low or high resolution scanning; and
- means responsive to the radiant energy impinging the medium from the low and high resolution beams for generating separately coarse and fine scan video signals, respectively.

18. A system as defined in claim 17, further comprising means for selectively transmitting one of the coarse and fine scan video signals on a transmission carrier signal.

19. A method for interrogating information recorded on a record medium, comprising the steps of:
- scanning the width of a scanning area with a low resolution radiant energy beam;
- selectively converting the low resolution beam into at least two high resolution beams having a cross-sectional dimension in the scanning area less than the cross-sectional dimension of the low resolution beam;
- scanning at least portions of adjacent segments of the width of the scanning area with the high resolution radiant energy beams;
- longitudinally conveying the record medium past the scanning area so that the respective beams trace out on the record medium a series of substantially contiguous transverse scan lines during either low or high resolution scanning; and
- generating separately coarse and fine scan video signals in response to the radiant energy impinging the medium from the low and high resolution beams, respectively.

20. A method in accordance with claim 19, further comprising the step of:
- repositioning within the scanning area a portion of the record medium scanned by the low resolution beam for scanning by the high resolution beam.

21. A method as defined in claim 19 in which:
- the high resolution scanning beams are produced by optically condensing and redirecting the image of the low resolution beam impinging the record medium.

22. A system according to claim 17, in which:
- the conveying means includes means for modifying the rate of conveyance of the medium through the scanning area during high resolution scanning according to the relative cross-sectional dimensions of the high and low resolution beams.

23. Apparatus according to claim 12, in which:
- the record medium is a film strip;
- the drum is radiant energy transmissive; and
- the radiant energy responsive means is disposed at the interior of the drum to respond to energy impinging the film strip and passing through the drum.

References Cited

UNITED STATES PATENTS

| | | | |
|---|---|---|---|
| 2,256,317 | 9/1941 | Earp | 325—60 X |
| 2,629,011 | 2/1953 | Graham | 178—6.8 |
| 2,911,463 | 11/1959 | Kretzmer | 178—6 |
| 3,128,338 | 4/1964 | Teacher et al. | 178—6.8 |
| 3,201,512 | 8/1965 | Mason et al. | 178—6 |
| 3,234,327 | 2/1966 | McMann | 178—6.8 |
| 3,391,339 | 7/1968 | Lynch | 325—60 X |
| Re. 26,412 | 6/1968 | Dolby et al. | 178—5.4 |

OTHER REFERENCES

"A Two-Phase Telecommunication System," parts 1 and 2 from "Electronics Engineering," magazine, May 1948, pp. 150–151 and June 1948, pp. 192–195. Copy is *in* 325–138.

ROBERT L. GRIFFIN, Primary Examiner

RICHARD K. ECKERT, JR., Assistant Examiner

U.S. Cl. X.R.

325—60, 137, 138